US009690913B2

(12) United States Patent
Balu et al.

(10) Patent No.: US 9,690,913 B2
(45) Date of Patent: Jun. 27, 2017

(54) LICENSE MANAGEMENT IN A NETWORKED SOFTWARE APPLICATION SOLUTION

(75) Inventors: Suresh Balu, Chapel Hill, NC (US); Solomon Michael Bisker, Fort Meyers, FL (US); Zahir A. Dossa, Boston, MA (US); Hyduke Noshadi, Northridge, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1472 days.

(21) Appl. No.: 12/036,361

(22) Filed: Feb. 25, 2008

(65) Prior Publication Data
US 2009/0216548 A1  Aug. 27, 2009

(51) Int. Cl.
  *G06F 21/00* (2013.01)
  *G06F 21/10* (2013.01)
  *G06Q 50/18* (2012.01)

(52) U.S. Cl.
  CPC ........... *G06F 21/105* (2013.01); *G06Q 50/18* (2013.01)

(58) Field of Classification Search
  CPC .............................. G06F 21/10; G06F 21/105
  USPC ....................................................... 705/1, 59
  See application file for complete search history.

(56) References Cited

U.S. PATENT DOCUMENTS

| | | | | |
|---|---|---|---|---|
| 5,367,686 A * | 11/1994 | Fisher et al. | ................... | 717/174 |
| 5,442,791 A * | 8/1995 | Wrabetz | ................ | G06F 9/5072 709/202 |
| 5,717,930 A * | 2/1998 | Imai | ......................... | G06F 8/61 713/1 |
| 5,758,068 A | 5/1998 | Brandt et al. | | |
| 5,892,900 A * | 4/1999 | Ginter et al. | ................... | 726/26 |
| 5,974,454 A * | 10/1999 | Apfel | ....................... | G06F 8/65 709/218 |
| 5,978,594 A * | 11/1999 | Bonnell et al. | ................. | 710/17 |
| 6,117,187 A * | 9/2000 | Staelin | ...................... | G06F 8/61 717/169 |
| 6,199,204 B1 * | 3/2001 | Donohue | ................. | G06F 8/65 705/59 |
| 6,301,707 B1 * | 10/2001 | Carroll | ...................... | G06F 8/61 717/177 |
| 6,519,581 B1 * | 2/2003 | Hofmann | ............... | G06N 5/043 706/45 |

(Continued)

OTHER PUBLICATIONS

Digital Equipment Corporation, Polycenter Software Installation Utility User's Guide, Digital Equipment Co., pp. i-xi, 1.1-1.3, 2.1-2.10, 3.1-3.3, 4.1-4.7, 5.1-5.6, 6.1, c8-c19, Mar. 1994.*

*Primary Examiner* — Alexis Casey
(74) *Attorney, Agent, or Firm* — Lee Law, PLLC; Christopher B. Lee

(57) ABSTRACT

A networked software solution comprising a plurality of servers, and application programs at various of the servers forming components of the solution. License information for all networked applications that form part of the solution is stored at each server that forms part of the solution. At relevant times, a server might determine from it's stored license information whether or not the applications of the solution are all operating according to unexpired licenses. In this way all servers of a solution receive and store the license information pertaining to other required applications of the solution and can determine at any time if the solution is validly licensed.

15 Claims, 5 Drawing Sheets

(56) References Cited

U.S. PATENT DOCUMENTS

| | | | |
|---|---|---|---|
| 6,574,612 B1 | 6/2003 | Baratti et al. | |
| 6,775,829 B1* | 8/2004 | Kroening | G06F 8/63 717/120 |
| 6,823,373 B1 | 11/2004 | Pancha et al. | |
| 6,990,660 B2* | 1/2006 | Moshir et al. | 717/171 |
| 7,035,918 B1* | 4/2006 | Redding | G06F 21/105 370/352 |
| 7,103,574 B1* | 9/2006 | Peinado et al. | 705/51 |
| 7,124,409 B2* | 10/2006 | Davis | G06F 8/60 717/178 |
| 7,137,114 B2 | 11/2006 | Rich et al. | |
| 7,155,414 B2 | 12/2006 | Barritz et al. | |
| 7,194,439 B2 | 3/2007 | Kassan et al. | |
| 7,334,226 B2* | 2/2008 | Ramachandran | G06F 8/61 709/220 |
| 7,523,072 B2* | 4/2009 | Stefik et al. | 705/59 |
| 7,536,356 B2* | 5/2009 | Eng | 705/59 |
| 7,565,325 B2* | 7/2009 | Lenard et al. | 705/59 |
| 7,584,470 B2* | 9/2009 | Barker | G06F 8/61 717/168 |
| 7,603,318 B1* | 10/2009 | Colosso et al. | 705/59 |
| 7,626,944 B1* | 12/2009 | Riddle | H04L 41/0806 370/254 |
| 7,661,147 B2* | 2/2010 | Pastorelli et al. | 726/27 |
| 8,019,835 B2* | 9/2011 | Suorsa | G06F 8/61 709/217 |
| 8,230,417 B1* | 7/2012 | Clark et al. | 717/174 |
| 2004/0117467 A1 | 6/2004 | Rich et al. | |
| 2005/0004873 A1* | 1/2005 | Pou et al. | 705/51 |
| 2005/0027846 A1* | 2/2005 | Wolfe et al. | 709/223 |
| 2005/0097547 A1* | 5/2005 | Ramachandran | G06F 8/61 717/177 |
| 2006/0085355 A1* | 4/2006 | Coley | G06F 21/10 705/59 |
| 2007/0027846 A1* | 2/2007 | Christiance | G06Q 30/02 |
| 2007/0033273 A1* | 2/2007 | White | G06F 8/30 709/223 |
| 2007/0088799 A1* | 4/2007 | Luft et al. | 709/217 |
| 2007/0106622 A1 | 5/2007 | Boomershine et al. | |
| 2007/0150417 A1* | 6/2007 | Hu | 705/59 |
| 2008/0082450 A1* | 4/2008 | Grimm et al. | 705/59 |
| 2008/0244600 A1* | 10/2008 | Wong | G06F 9/5083 718/104 |
| 2013/0080360 A1* | 3/2013 | Sterritt | G05B 13/02 706/14 |

\* cited by examiner

LICENSE MANAGEMENT IN A NETWORKED SOFTWARE APPLICATION SOLUTION

TECHNICAL FIELD

The present invention relates to data processing systems and, more particularly, to a software license management scheme in a networked software solution that operates by propagating license information for each software component in the solution to all of the networked application servers that form part of the solution.

BACKGROUND OF THE INVENTION

Current state of the art software license protection methods support software license enforcement based on a "license key" concept. A license key, herein referenced as "key," is an encrypted string that contains information such as, for example, the software product's ID, the software product's entitled usage limit and expiration date, and the serial number of the system where the key may be installed. Computer enterprises, which consist of multiple systems, are supported using either of the two following methods.

Firstly, a key is created, then distributed, then installed, for each licensed software product on each system. Unfortunately, this method can result in a large number of keys that are often quite difficult to manage. For example, an enterprise with 11,000 systems and three software packages would need 33,000 unique keys. To reduce the number of keys, some vendors offer a key that is not based on a system serial number and that can be installed on any system. For this example, only three keys would then be needed, meaning one per licensed product.

In spite of the known solutions, there still remain difficulties in license management. Currently license manager products are used to manage software licenses. However, they need their own infrastructure as well as initial user involvement. Another of the difficulties of enforcing license criteria, especially in a networked software solution, is that each application or component in the solution may need to rely on the licensed operation of other applications or components to perform their respective roles in the solution. For instance, if a payroll application requires a database management application for the entire solution to function properly, there is a need to insure that the payroll application and the database management application both have valid licenses. However it is difficult in conventional systems to communicate the validity of licenses from one application to another. Conventional license managers do not offer any means for different applications that form a solution to communicate with each other regarding the validity or invalidity of the respective licenses.

SUMMARY OF THE INVENTION

The invention securely embeds license information within all of the individual applications or servers that participate in a solution. The different applications in a solution are able to query other applications or components and validate the legality of using the application or component as a part of the solution.

The invention is accomplished in a networked software solution comprising a plurality of servers, and application programs at various of the servers forming components of the solution. License information for all networked applications that form part of the solution is stored at each server that forms part of the solution. At relevant times, a server might determine from its stored license information whether or not the applications of the solution are all operating according to unexpired licenses. This determination can occur as part of an installation of an application at one of the servers that forms part of the solution. The installation of an application is preferably controlled by an installation script executed at one of the servers that specifies all required applications of a solution and their respective addresses in a solution network. The script controls the transmission of license information for the application being installed to all other networked servers having applications that form part of the solution. The servers receiving the license information of the application being installed returns to the one of the servers license information pertaining to the required application at the receiving server. In this way all servers of a solution receive and store the license information pertaining to other required applications of the solution and can determine at any time if the solution is validly licensed.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
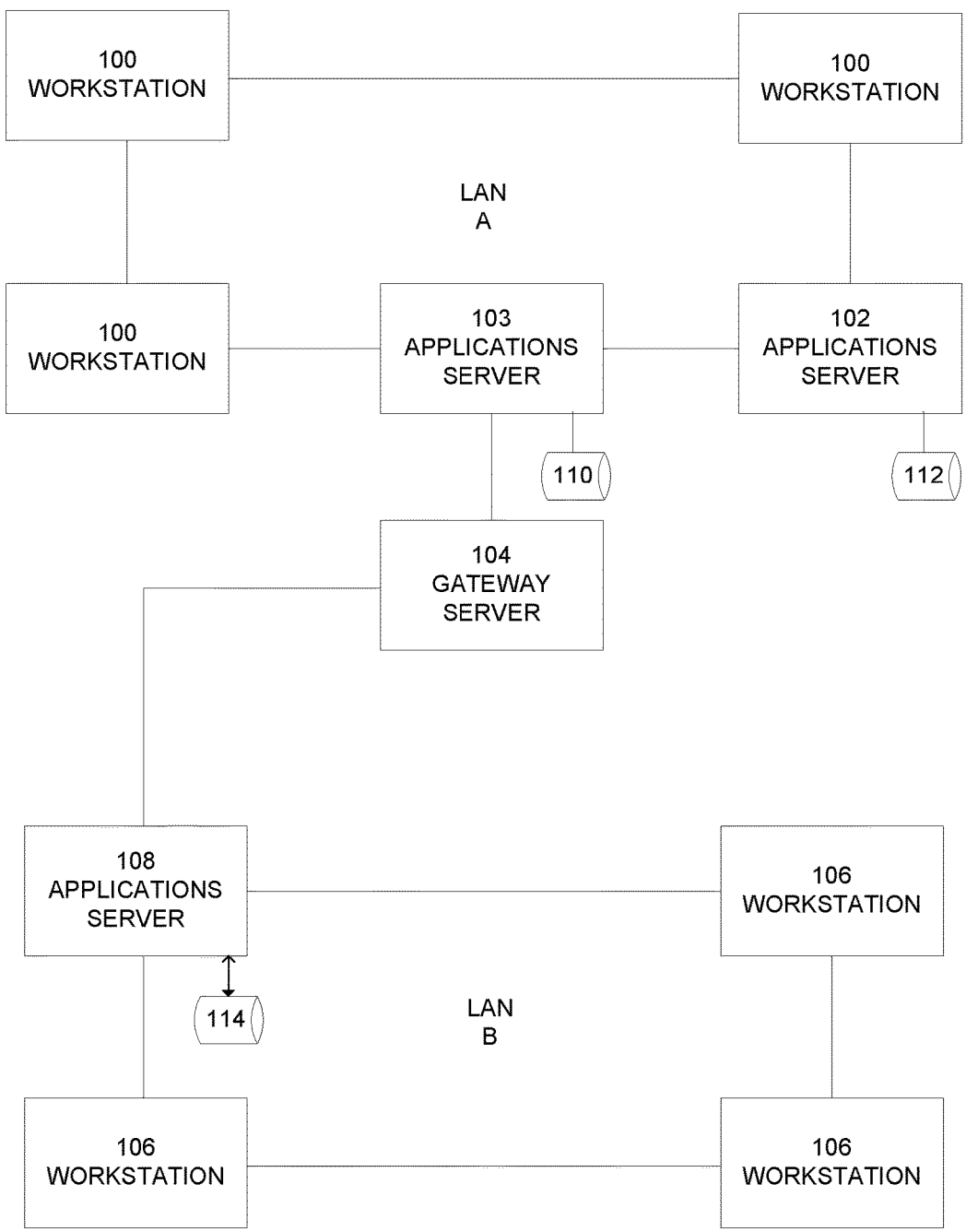
FIG. 1 depicts an illustrative distributed data processing system in which the present invention might be practiced.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, or store the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to the figures and in particular with reference to FIG. 1, there is depicted a pictorial representation of a illustrative distributed data processing system that comprises two LANs A and B connected by a gateway server 104, which may be utilized to implement the present invention. It is understood that the network of FIG. 1 is entirely by way of example to teach the principles of the invention. LAN A comprises a number of interconnected client workstations 100 and application servers 102 and 103. Application server 103 also serves to connect LAN A to gateway server 104 and thence to applications server 108 in LAN B. LAN B also comprises a number of interconnected client workstations 106.

As is common in such data processing systems, each server may contain or be coupled to a storage device, such as 110, 112 and 114, which service respectively servers 103, 102 and 108. These storage devices may be utilized, in accordance with the invention, to store the various data objects or documents that might be periodically accessed and processed by the license management system to be described.

Figure 2:
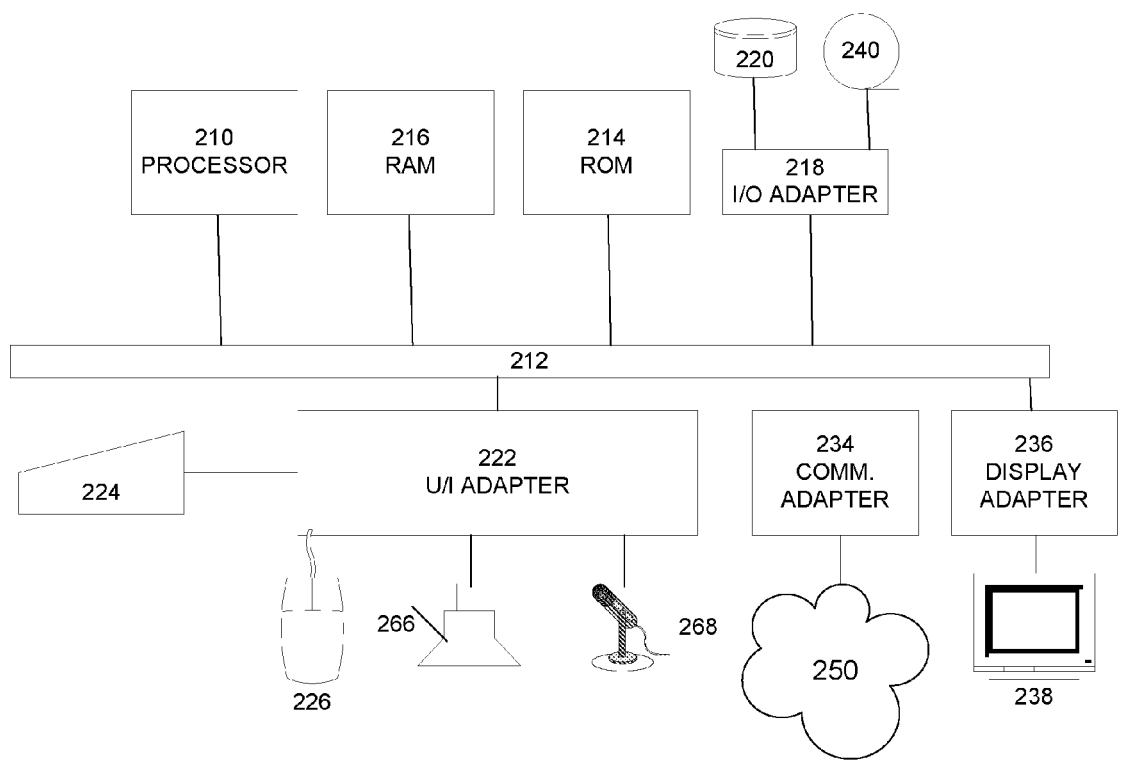
FIG. 2 depicts an illustrative example of components that might comprise an application server in the network of FIG. 1.

FIG. 2 illustrates a simplified example of an information handling system, such as a server, that may be used as application servers or workstations, or gateways in the present invention. The invention may be implemented on a variety of hardware platforms, including embedded systems, personal computers, workstations, servers, and mainframes. The system of FIG. 2 has at least one processor 210. Processor 210 is interconnected via system bus 212 to random access memory (RAM) 216, read only memory (ROM) 214, and input/output (I/O) adapter 218 for connecting peripheral devices such as disk unit 220 and tape drive 240 to bus 212. The system has user interface adapter 222 for connecting keyboard 224, mouse 226, or other user interface devices such as audio output device 266 and audio input device 268 to bus 212. The system has communication adapter 234 for connecting the information handling system to a data processing network 250, and display adapter 236 for connecting bus 212 to display device 238. Communication adapter 234 may link the system depicted in FIG. 2 with hundreds or even thousands of similar systems, or other devices, such as remote printers, remote servers, or remote storage units. The system depicted in FIG. 2 may be linked to both local area networks (sometimes referred to as intranets) and wide area networks, such as the Internet.

It will be appreciated that the computer system illustrated in FIG. 2 is merely illustrative, and is not meant to be limiting in terms of the type of system that might provide a suitable operating environment for practicing the present invention. While the computer system described in FIG. 2 is capable of executing the processes described herein, this computer system is simply one example of a computer system. Many systems are capable of performing the processes of the invention.

Figure 3:
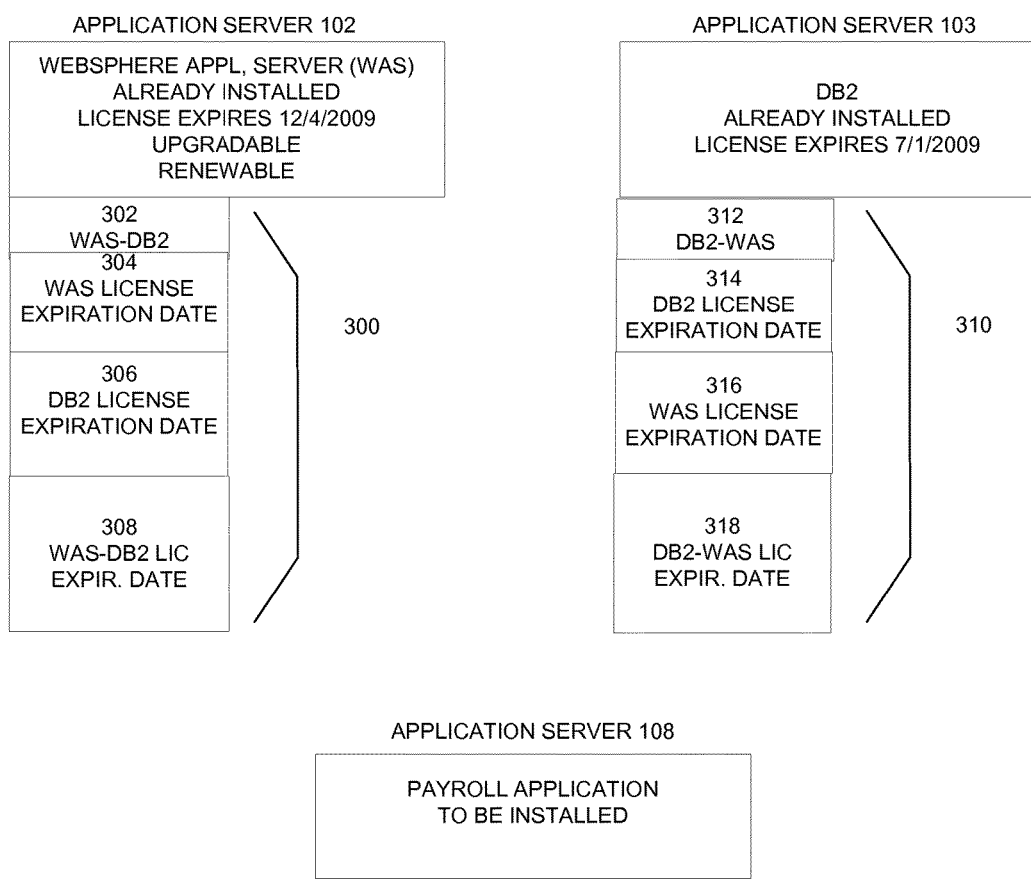
FIG. 3 depicts an example of a distributed application server environment comprising a web server application and a database management application. Also shown is an illustrative storage structure at each server for maintaining license information of software applications of the system before the addition of an illustrative payroll application to form a payroll solution.

FIG. 3 illustrates the three servers 102, 103 and 108 and the states of memory storage at each server that are relevant to the invention at a time prior to installation of an illustrative payroll application. It is assumed for illustration that the payroll application, once installed, will require the services of a web server and a database manager to operate. FIG. 3 assumes that a web server, such as IBM's WebSphere Application Server (WAS) is already installed at server 102 and a database manager, such as IBM's DB/2, is installed at server 103. Each server contains in it's storage memory the relevant license details of all other system applications relevant to a solution. Accordingly, assuming that the web server and database manager are already part of a different solution, a data structure 300 is already present within the storage device 112 of server 102 and contains the license details relating to the primary application of server 102, WAS in operation with remote application DB/2. Similarly, server 103 has a data structure 310 that contains the similar license details relating to DB/2 in operation with WAS. It is assumed that the payroll application is to be installed in server 108, but since the payroll application is not yet installed in server 108, no similar data structure is shown at that server. However, as an aid, server 108 is shown in FIG. 3 with text stating that a payroll application is to be installed and it's license expiration is illustratively shown as Jul. 1, 2009.

Returning now to data structure 300 at server 102, storage entry 302 contains data that identifies data structure 300 as containing the relevant license details of WAS with respect to DB2. Entry 304 contains the expiration date of the WAS license. Entry 306 contains the DB/2 license expiration date. As will be explained below, entry 308 contains a date at which time the combination of WAS operating in concert with DB2 becomes invalid. This, of course, would be governed by the application having the earliest license expiration date. It is understood that other WAS and/or DB2 license information can be stored in data structure 300 as well, depending on what features might also be desirable in a given situation. Data structure 310 has entries 312 through 318 that contain information similar to that of data structure 300, except the focus is on DB/2 operating in concert with WAS.

Figure 4:
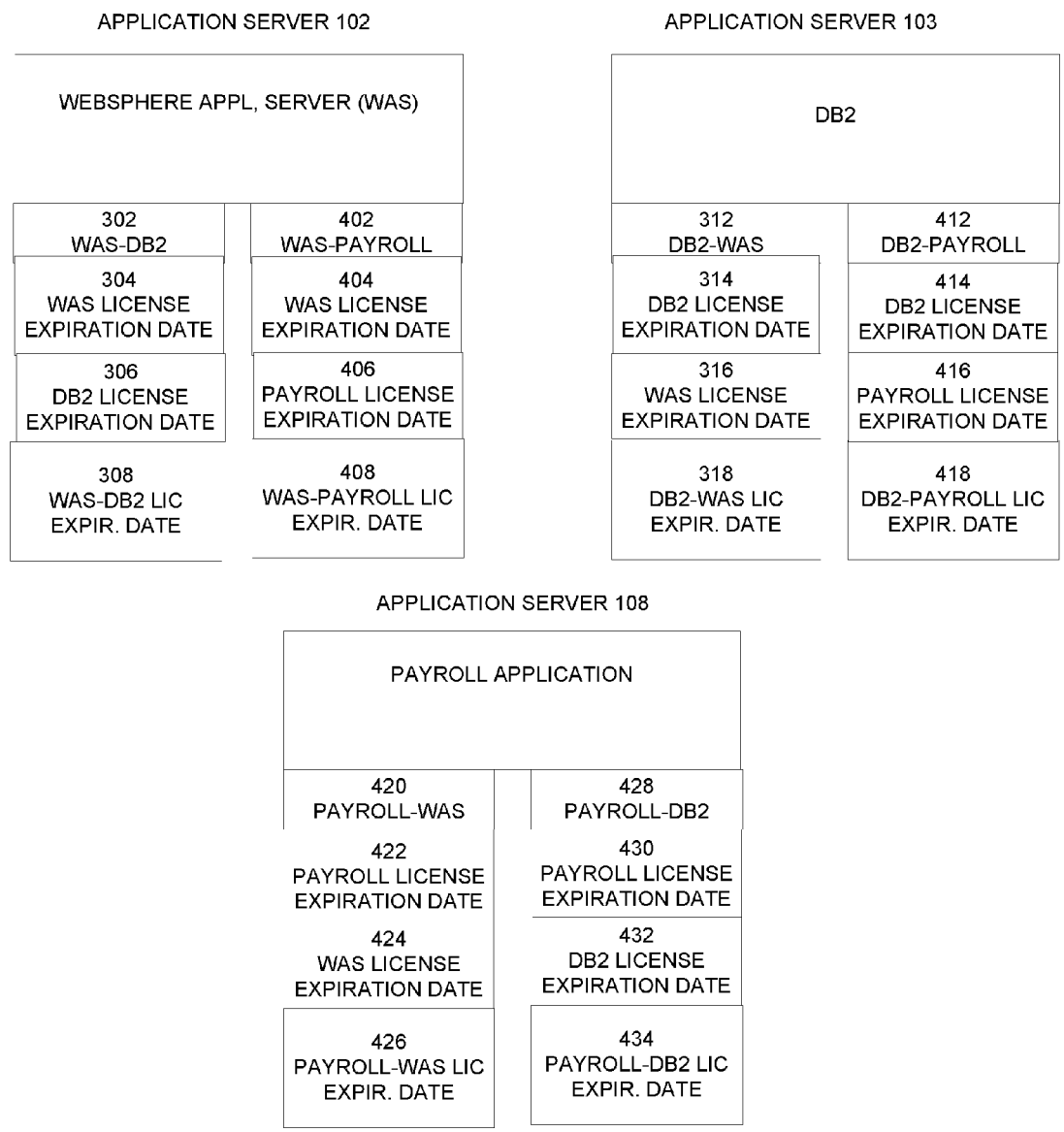
FIG. 4 depicts the system of FIG. 3 after the installation of an illustrative payroll application that depends on the operation of the web server and database management applications.

FIG. 4 shows the three servers and their illustrative data structures after the payroll application is installed. The data entries 302 through 308 at server 102 relating to WAS-DB/2 have not changed, nor have the corresponding entries 312 through 318 at server 103 relating to DB/2-WAS. However, new data structures containing entries 402 through 408 at server 102 have been added relating to the combination of the WAS operating with the payroll application at server 108. Similarly, new data entries 412 through 418 are now present at server 103 relating to the license terms pertaining to DB/2 in relation to the payroll application. With reference to server 108 in FIG. 4, it is seen that there are now two data structures, one containing entries 420 through 426 containing the license data relevant to the payroll application operating with WAS at server 102, and entries 428 through 434 for payroll operation with DB/2 at server 103. All servers now have all information that is needed to verify that the networked payroll solution is validly licensed. In particular, entries 308, 408, 318, 418, 426 and 434 contain the expiration dates for a combination pair of two applications and it is possible to compute an overall solution termination date from these entries at each server. This can be done at payroll application installation time and saved at each server, or the computation can be performed repeatedly at intervals or for each transaction at a server, depending on how one wish to structure the system.

Figure 5:
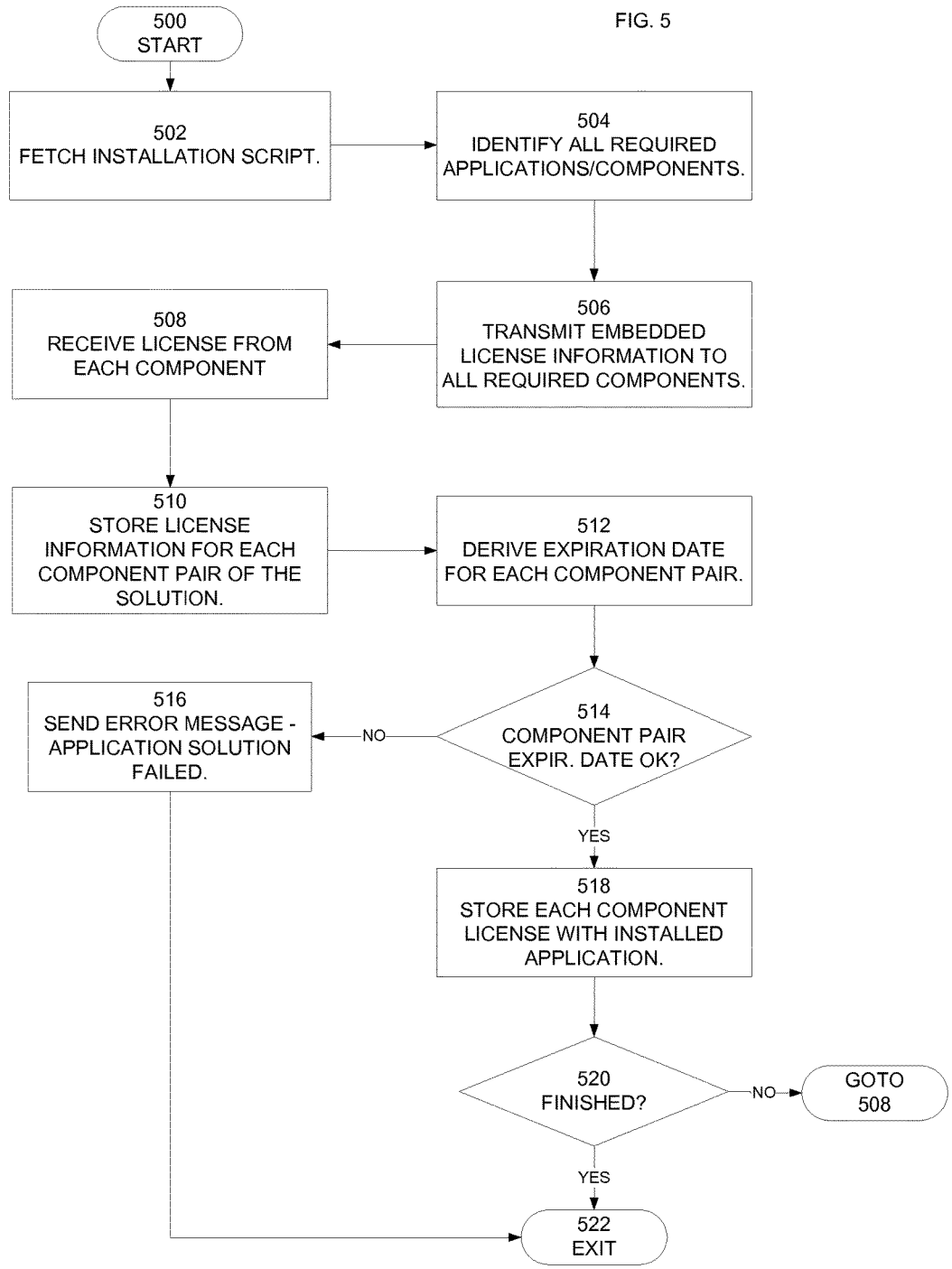
FIG. 5 shows an illustrative flowchart that describes software processing performed at each application server during the installation of software components to insure the license validity of the overall illustrative payroll solution.

Installation of the payroll application and testing of the component application licenses can be performed automatically by using an installation script program, such as Installshield, marketed by Macrovision, or using a network software installation system such as disclosed in U.S. Pat. No. 7,124,409, entitled "Automatic Software Installation on Heterogeneous Networked Computer Systems, which issued to Michael Davis et al on Oct. 17, 2006. FIG. 5 of the instant invention contains an illustrative flowchart of process steps that might be added to the aforementioned U.S. Pat. No. 7,124,409 at each network server to perform license management in accordance with the invention. When the payroll application installation is initiated at server 108, license management begins at server 108 at step 500 of FIG. 5, which is labeled START. This is the principal server where the payroll manager is to be installed. Step 502 next fetches an installation script that has been prepared most likely by a network administrator, or a solution vendor, and contains the information necessary to install the principal application, in this example the payroll application. This would include information such as the payroll application files, relative directory locations, necessary remote applications such as WAS and DB2 and their network addresses, locations of other required information, and so on. The script file will also contain the relevant license information for the principal application, or it might contain the filename and location of the license information.

Once the required information is obtained, step 504 proceeds to identify all required solution applications and system components. In this illustrative example, these would be the principal payroll application, the web server at server 102 and the database manager at server 103. Step 506 next transmits a message with embedded license information to all required components of the solution to activate the install programs at each required server. This message identifies the solution being installed and the application component at the server receiving the message. As a result, the receiving server establishes a license data structure, such as was described with regard to FIGS. 3 and 4 to store the relevant license information. For example, at server 102, the install program generates data entries 402 through 408 for the WAS-payroll combination of the solution. At server 103, in response to a message from principal server 108, the installation program generates the data entries 412 through 418 for the DB2-Payroll combination of the solution. As each non-principal server completes the above steps, it returns a response message to the principal server containing the license information of the component application at that non-principal server. For example, server 102 returns the license information for it's web server to the principal server 108. When all response messages have been received, step 510 of the principal server stores the license information in data entries 420 through 426 and 428 through 434 for the Payroll-WAS and Payroll-DB/2 component pairs of the solution, respectively. In this illustrative embodiment, step 512 now uses the stored license information to derive an expiration date for each component pair. Step 514 tests the derived expiration date for the component pair to determine if the combination is still licensed. If the combination is not licensed, step 516 issues an error message and the installation is aborted. If the combination is valid, step 518 stores the license information for the combination as already described and step 520 returns to 508 to process another combination if needed. Otherwise, this part of the installation terminates at 522.

As mentioned earlier, these install programs might also generate an overall date for the expiration of the solution as a whole. However, for simplicity, such a data entry is not shown in the Figs.

It should also be clear that there are many ways that skilled artisans might use to accomplish the essential steps to police an overall network solution, other that the specific steps and data structures described herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

We claim:

1. A method executed by each of a network of application servers for software license management of a software solution formed by a plurality of different collaborating application programs distributed at various ones of the networked application servers, comprising:

activating, from a first software solution installation program at a first networked application server, software solution installation programs at each other networked application server that contains at least one other of the plurality of different collaborating application programs;

automatically generating interactively between the first software solution installation program and the activated software solution installation programs, at each networked application server that contains at least one of the plurality of different collaborating application programs, combined software license information that specifies relationships of software licenses of all of the plurality of different collaborating application programs that collectively as a set operate interactively among the networked application servers to form the software solution by each providing a respective different portion of functionality of the software solution; and determining at any of the networked application servers based upon the automatically generated combined software license information, whether or not the software solution is operating according to unexpired software licenses of all of the plurality of different collaborating application programs that collectively as the set operate interactively among the networked application servers to form the software solution by each providing the respective different portion of functionality of the software solution;

wherein each of the networked application servers comprise a memory and a computer processor; and where the determining step occurs at run-time as part of an installation of one of the plurality of different collaborating application programs that forms part of the software solution at the first networked application server.

2. The method of claim 1, further comprising controlling the installation of the one of the plurality of different collaborating application programs at the first networked application server by executing an installation script that specifies all of the collaborating application programs that collectively as the set form the software solution and their respective addresses in the network of application servers.

3. The method of claim 2, where the installation script further controls transmission of software license information of the one of the plurality of different collaborating application programs being installed to all other networked application servers with installed collaborating application programs that also form part of the software solution.

4. The method of claim 3, further comprising receiving, from each other networked application server to which the software license information of the one of the plurality of different collaborating application programs being installed was transmitted, software license information pertaining to any collaborating application program that forms part of the software solution installed at the respective other networked application server, where the received software license information forms a part of the generated combined software license information.

5. A non-transitory computer-readable program storage medium comprising program code executed by each of a network of application servers for software license management of a software solution formed by a plurality of different collaborating application programs distributed at various ones of the networked application servers, the networked application servers comprising a memory and a computer processor, where the program code when executed by the computer processor at a networked application serer causes the computer processor to:

activate, from a first software solution installation program at a first networked application server, software solution installation programs at each other networked application server that contains at least one other of the plurality of different collaborating application programs;

automatically generate interactively between the first software solution installation program and the activated software solution installation programs, at each networked application server that contains at least one of the plurality of different collaborating application programs, combined software license information that specifies relationships of software licenses of all of the plurality of different collaborating application programs that collectively as a set operate interactively among the networked application servers to form the software solution by each providing a respective different portion of functionality of the software solution; and determine at any of the networked application servers based upon the automatically generated combined software license information, whether or not the software solution is operating according to unexpired software licenses of all of the plurality of different collaborating application programs that collectively as the set operate interactively among the networked application servers to form the software solution by each providing the respective different portion of functionality of the software solution;

where the determining code is executed at run-time as part of an installation of one of the plurality of different collaborating application programs that forms part of the software solution at the first networked application server.

6. The non-transitory computer-readable program storage medium of claim 5, where the program code when executed by the computer processor at the networked application server causes the computer processor to control the installation of the one of the plurality of different collaborating application programs at the first networked application server by executing an installation script that specifies all of the collaborating application programs that collectively as the set form the software solution and their respective addresses in the network of application servers.

7. The non-transitory computer-readable program storage medium of claim 6, where the installation script further comprises code for controlling transmission of software license information of one of the plurality of different collaborating application programs being installed to all other networked application servers with installed collaborating application programs that also form part of the software solution.

8. The non-transitory computer-readable program storage medium of claim 7, where the program code when executed by the computer processor at the networked application server causes the computer processor to receive, from each other networked application server to which the software license information of the one of the plurality of different collaborating application programs being installed was transmitted, software license information pertaining to any collaborating application program that forms part of the software solution installed at the respective other networked application servers where the received software license information forms a part of the generated combined software license information.

9. A system for software license management of a software solution formed by a plurality of different collaborating application programs distributed at various ones of a plurality of networked application servers, comprising:

a memory at each networked application server; and a computer processor at each networked application server, each computer processor being programmed to:

activate, from a first software solution installation program at a respective networked application server, software solution installation programs at each of the networked application server that contains at least one other of the plurality of different collaborating application programs:

automatically generate within the memory interactively between the first software solution installation program and the activated software solution installation programs, at each networked application server that contains at least one of the plurality of different collaborating application programs, combined software license information that specifies relationships of software licenses of all of the plurality of different collaborating application programs that collectively as a set operate interactively among the networked application servers to form the software solution by each providing a respective different portion of functionality of the software solution; and determine, at any of the networked application servers based upon the automatically generated combined software license information, whether or not the software solution is operating according to unexpired software licenses of all of the plurality of different collaborating application programs that collectively as the set operate interactively among the networked application servers to form the software solution by each providing the respective different portion of functionality of the software solution, where the computer processor is programmed to determine at run-time whether or not the software solution is operating according to unexpired software licenses of all of the different collaborating application programs that form the software solution as part of an installation of one of the plurality of different collaborating application programs that forms part of the software solution at the respective networked application server.

10. The system of claim 9, where the computer processor at the one of the networked application servers controls the installation of the one of the plurality of different collaborating application programs by executing an installation script that specifies all of the collaborating application programs that collectively as the set form the software solution and their respective addresses in the network of application servers.

11. The system of claim 10, where the installation script further controls transmission of software license information of the one of the plurality of different collaborating application programs being installed to all other networked application servers with installed collaborating application programs that also form part of the software solution.

12. The system of claim 11, where the computer processor at the one of the networked application servers receives, from each other networked application server to which the software license information of the one of the plurality of different collaborating application programs being installed was transmitted, software license information pertaining to any collaborating application program that forms part of the software solution installed at the respective other networked application server, where the received software license information forms a part of the generated combined software license information.

13. The method of claim 1, where activating the software solution installation programs at each other networked application server that contains the at least one other of the plurality of different collaborating application programs comprises activating the software solution installation programs at each other networked application server in response to initiation of an installation of one of the plurality of different collaborating application programs at the first networked application server.

14. The non-transitory computer-readable program storage medium of claim 5, where the program code for activating the software solution installation programs at each other networked application server that contains the at least one other of the plurality of different collaborating application programs comprises program code for activating the software solution installation programs at each other networked application server in response to initiation of an installation of one of the plurality of different collaborating application programs at the first networked application server.

15. The system of claim 9, where, in being programmed to activate the software solution installation programs at each other networked application server that contains the at least one other of the plurality of different collaborating application programs, the computer processor at each networked application server is further programmed to activate the software solution installation programs at each other networked application server in response to initiation of an installation of one of the plurality of different collaborating application programs at the respective networked application server.

* * * * *